United States Patent
Itoh

(10) Patent No.: US 7,078,698 B2
(45) Date of Patent: Jul. 18, 2006

(54) SPECIMEN SENSING APPARATUS

(76) Inventor: Teruaki Itoh, 5-25, Kokaihommachi, Kumamoto-shi, Kumamoto-ken (JP)

(*) Notice: Subject to any disclaimer, the term of this patent is extended or adjusted under 35 U.S.C. 154(b) by 243 days.

(21) Appl. No.: 10/743,415

(22) Filed: Dec. 23, 2003

(65) Prior Publication Data

US 2004/0135090 A1    Jul. 15, 2004

(30) Foreign Application Priority Data

Dec. 27, 2002  (JP) .............................. 2002-382232

(51) Int. Cl.
*G01F 23/00*    (2006.01)
(52) U.S. Cl. ................... 250/357.1; 250/330; 250/332; 250/343
(58) Field of Classification Search ............. 250/357.1, 250/332, 343, 330
See application file for complete search history.

(56) References Cited

U.S. PATENT DOCUMENTS

| | | | | |
|---|---|---|---|---|
| 4,390,782 A | * | 6/1983 | Vornfett | ................... 250/223 B |
| 5,651,941 A | * | 7/1997 | Stark et al. | ................. 422/104 |
| 2002/0118874 A1 | | 8/2002 | Chung et al. | |
| 2002/0154809 A1 | * | 10/2002 | Yamagishi et al. | ......... 382/142 |
| 2003/0141456 A1 | * | 7/2003 | Mc Neal et al. | ......... 250/357.1 |

FOREIGN PATENT DOCUMENTS

| | | |
|---|---|---|
| JP | 2001-221746 | 8/2001 |
| JP | 2002-323479 | 11/2002 |
| KR | 2002-0054223 | 7/2002 |
| KR | 10-0287967 | 11/2002 |

* cited by examiner

*Primary Examiner*—David Porta
*Assistant Examiner*—Christopher Webb
(74) *Attorney, Agent, or Firm*—Nixon & Vanderhye P.C.

(57) ABSTRACT

A specimen sensing apparatus according to the present invention includes a specimen container which is vertically positioned by a container holder of a columnar rack type and conveyed by a belt conveyor, an infrared CCD camera configured to pick up an infrared image of the specimen container, a visible image converter which converts the infrared image picked up by the infrared CCD camera into a visible image, an image signal processing unit which processes and converts one of the infrared image and the visible image into a signal that is suitable to measure a specimen amount, and a specimen amount measuring unit which measures an amount of specimen contained in the specimen container in response to the signal processed by the image signal processing unit.

1 Claim, 1 Drawing Sheet

SPECIMEN SENSING APPARATUS

CROSS-REFERENCE TO RELATED APPLICATIONS

This application is based upon and claims the benefit of priority from the prior Japanese Patent Application No. 2002-382232, filed Dec. 27, 2002, the entire contents of which are incorporated herein by reference.

BACKGROUND OF THE INVENTION

1. Field of the Invention

The present invention relates to a specimen sensing apparatus for sensing a specimen such as blood, which is contained in a container such as a test tube.

2. Description of the Related Art

Jpn. Pat. Appln. KOKAI Publication No. 2002-323479 discloses a specimen sensing apparatus as described above. In this apparatus, a sensing coil is fitted to a test tube containing serum and clot that are separated from each other by a silicon-separating agent. The sensing coil and test tube are moved relative to each other while the sensing coil is being supplied with a measured signal having a given frequency. Based on variations in the level of the measured signal, a separation surface between the serum and clot is detected.

The above apparatus is designed to magnetically sense a specimen in a test tube by fitting the sensing coil to the test tube. It is not therefore suitable to sense a specimen contained in a container while a belt conveyor is conveying the container.

BRIEF SUMMARY OF THE INVENTION

An object of the present invention is to provide a specimen sensing apparatus having the following advantages.

1) A specimen contained in a container can be sensed easily and exactly even while a belt conveyor is conveying the container.

2) A specimen contained in a container can be sensed even though the container is labeled with a barcode on its outer surface.

In order to attain the above object, specimen sensing apparatus according to the present invention has the following characteristic configuration. The other characteristic configurations will be clarified in the Embodiment.

A specimen sensing apparatus according to an aspect of the present invention, comprises a specimen container which is vertically positioned by a container holder of a columnar rack type and conveyed by a belt conveyor; an infrared CCD camera configured to pick up an infrared image of the specimen container; a visible image converter which converts the infrared image picked up by the infrared CCD camera into a visible image; an image signal processing unit which processes and converts one of the infrared image or the visible image into a signal that is suitable to measure a specimen amount; and a specimen amount measuring unit which measures an amount of specimen contained in the specimen container in response to the signal processed by the image signal processing unit.

DETAILED DESCRIPTION OF THE INVENTION

Embodiment

Figure 1:
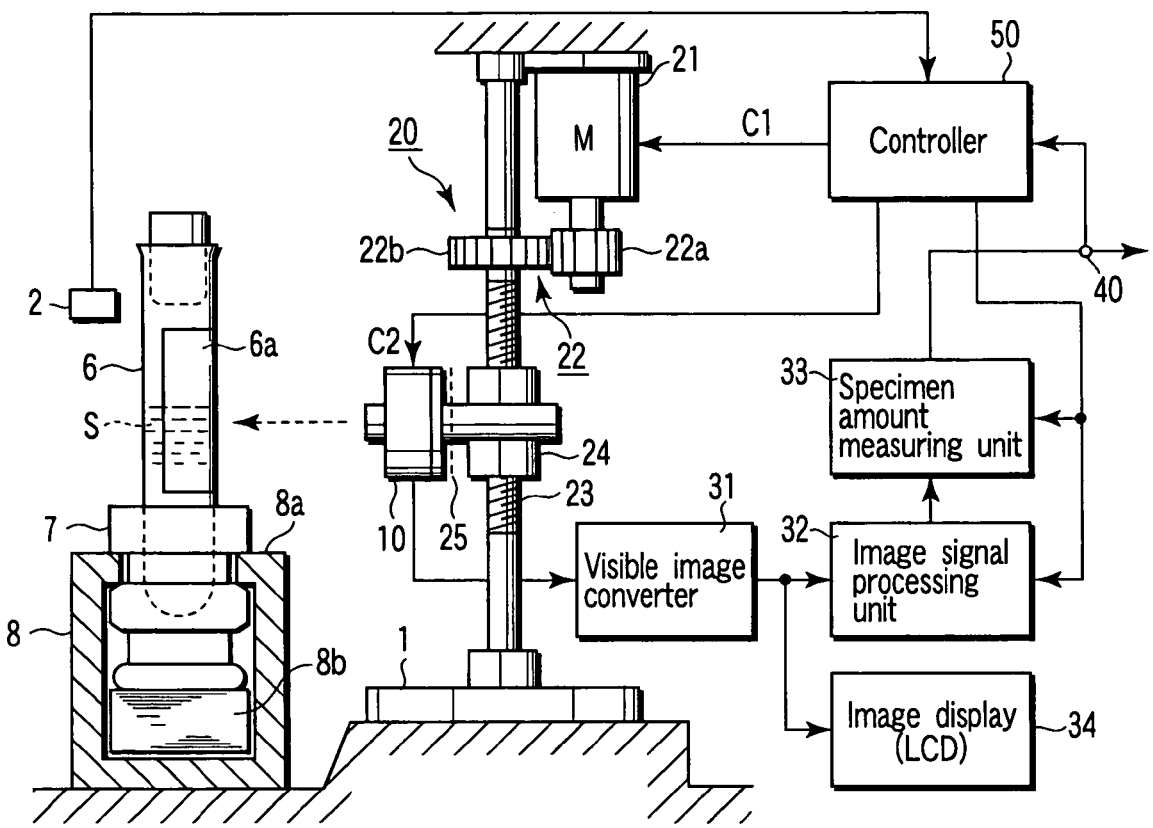
FIG. 1 is a block diagram showing a specimen sensing apparatus according to an embodiment of the present invention.

FIG. 1 illustrates a specimen sensing apparatus according to an embodiment of the present invention. The apparatus is configured as follows. When a specimen container (test tube) 6 is stored in, for example, a stocker or a stock yard (neither of which is shown), an infrared CCD camera 10 takes a picture of the container 6 to sense whether a specimen is contained in the container 6 by a given amount. The configuration of the apparatus will be described below more specifically.

The specimen container 6 is labeled with a barcode 6a on its outer surface and vertically held in a container holder 7 called a columnar rack. In this state, the container 6 is conveyed to a stocker or a stock yard by a belt conveyor 8. The belt conveyor 8 includes a guide rail 8a and a conveying endless belt 8b. The container 6 contains a specimen S as blood obtained by centrifuging.

The infrared CCD camera 10 is located beside the belt conveyor 8 and its height is chiefly controlled by a position control unit 20. The position control unit 20 includes a motor 21 that rotates forward and backward, deceleration gear mechanisms 22a and 22b that decelerate the rotation of the motor 21, a lead screw 23 that is vertically positioned on a mounting base 1 such that it rotates at low speed by the deceleration gear mechanisms 22a and 22b, a slider 24 that moves up and down in accordance with the rotation of the lead screw 23, and a fixing member 25 which fixes the infrared CCD camera 10 to the slider 24.

A visible image converter 31 is connected to the output terminal of the infrared CCD camera 10. The converter 31 converts an infrared image picked up by the camera 10 into a visible image. An image signal processing unit 32 processes and converts the infrared image or visible image into a signal that is suitable to measure a specimen amount. A specimen amount measuring unit 33 measures a specimen amount in response to the signal processed by the image signal processing unit 32. An image display 34 that is formed of an LCD can display the visible image.

The specimen amount measuring unit 33 outputs a measured signal to a host computer (not shown) through the output terminal 40. The measured signal is also supplied to a controller 50 as a return command signal. The controller 50 controls the infrared CCD camera 10 and position control unit 20 in association with each other.

The specimen sensing apparatus so configured operates as follows. The specimen container 6 is conveyed by the belt conveyor 8, and stopped in the camera setup position by a stop mechanism (not shown) and sensed by an optical sensor 2. In response to the sensed signal of the optical sensor 2, the controller 50 operates to supply a control signal C1 to the motor 21 of the position control unit 20 and supply a control signal C2 to the infrared CCD camera 10. Thus, as the motor 21 rotates forward, the lead screw 23 also rotates forward and the slider 24 moves up. Accordingly, the infrared CCD camera 10 photographs the container 6 while moving up.

Figure 2:
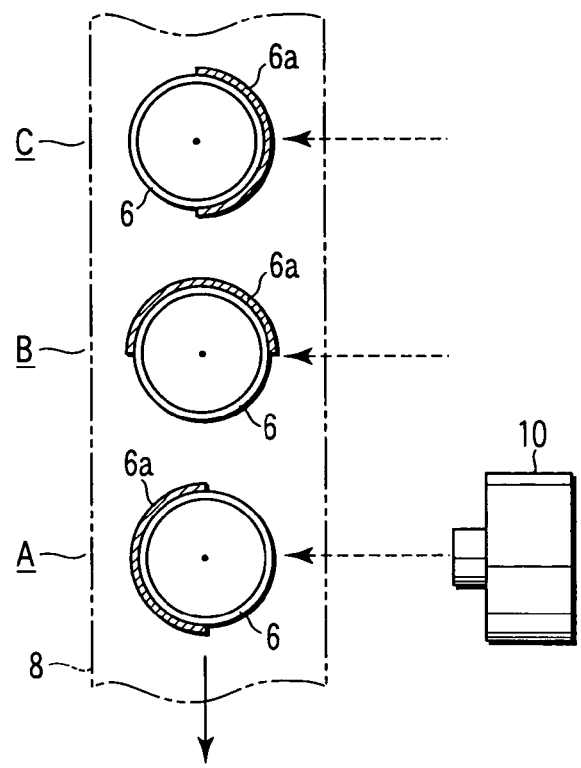
FIG. 2 is a schematic plan view showing an operation of the specimen sensing apparatus according to the embodiment of the present invention.

When the container 6 is photographed, the barcode 6a adhered to the outer surface of the container 6 is oriented in various directions. For example, in FIG. 2, it is located behind the container 6 when viewed from the camera 10 as indicated by symbol A, it is horizontally oriented as indicated by symbol B, and it is opposed to the camera 10 as indicated by symbol C. Since, however, the camera 10 is an infrared CCD camera, it can photograph a specimen S through the container 6 without any trouble, regardless of how the barcode 6a is oriented.

The visible image converter 31 converts an infrared image of the specimen S photographed by the camera 10 into a visible image. Since the visible image is displayed on the image display 34, it can timely be monitored. The image signal processing unit 32 converts the visible image into a signal that is suitable to measure a specimen amount. In response to this signal, the specimen amount measuring unit 33 measures an amount of specimen S (or senses whether the container 6 contains a specimen or not). In other words, the unit 33 senses whether the specimen S such as blood is contained in the container 6 by a given amount and sends a measured signal indicative of the result to the host computer and the like.

The above measured signal is supplied to the controller 50 as a return command signal. The controller 50 therefore starts to perform a reset control operation, with the result that the infrared CCD camera 10 is lowered by the position control unit 20 and returned to the initial position, and the camera 10 stops operating. The camera 10 thus stands by for a next specimen container 6.

Repeating the above operation, an amount of specimen in each of specimen containers 6 conveyed by the belt conveyor 8 can be sensed with very efficiency.

Features of Embodiment

[1] A specimen sensing apparatus according to an embodiment of the present invention, comprises:

a specimen container 6 which is vertically positioned by a container holder 7 of a columnar rack type and conveyed by a belt conveyor 8;

an infrared CCD camera 10 configured to pick up an infrared image of the specimen container 6;

a visible image converter 31 which converts the infrared image picked up by the infrared CCD camera 10 into a visible image;

an image signal processing unit 32 which processes and converts one of the infrared image or the visible image into a signal that is suitable to measure a specimen amount; and a specimen amount measuring unit 33 which measures an amount of specimen contained in the specimen container 6 in response to the signal processed by the image signal processing unit 32.

In the specimen sensing apparatus described above, the infrared CCD camera 10 photographs and senses a specimen contained in the specimen container 6. The specimen can thus be sensed easily and exactly even while the belt conveyor 8 is conveying the container 6. The specimen can also be sensed without any trouble even though its surroundings are dark or even when the container 6 is labeled with a barcode on its outer surface.

[2] The specimen sensing apparatus according to above item [1], further comprises control means for starting to operate the infrared CCD camera 10 when the specimen container 6 comes in front of the camera 10 and stopping operating the camera 10 when the specimen amount measuring unit 33 sends a measured signal.

Modification

The specimen sensing apparatus according to an embodiment of the present invention has the following modification:

When the infrared CCD camera 10 lowers, it takes a picture of the specimen container 6.

What is claimed is:

1. A specimen sensing apparatus comprising:

a specimen container which is vertically positioned by a container holder of a columnar rack type and conveyed by a belt conveyor;

an infrared CCD camera configured to pick up an infrared image of the specimen container;

a visible image converter which converts the infrared image picked up by the infrared CCD camera into a visible image;

an image signal processing unit which processes and converts one of the infrared image and the visible image into a signal that is suitable to measure a specimen amount;

a specimen amount measuring unit which measures an amount of specimen contained in the specimen container in response to the signal processed by the image signal processing unit; and control means for starting to operate the infrared CCD camera when the specimen container comes in front of the camera and stopping operating the camera when the specimen amount measuring unit sends a measured signal.

* * * * *